United States Patent [19]
Zweifel

[11] Patent Number: 5,119,091
[45] Date of Patent: Jun. 2, 1992

[54] METHOD AND APPARATUS FOR ADJUSTING WINDSHEAR WARNING THRESHOLD

[75] Inventor: Terry L. Zweifel, Phoenix, Ariz.

[73] Assignee: Honeywell Incorporated, Minneapolis, Minn.

[21] Appl. No.: 590,757

[22] Filed: Oct. 1, 1990

[51] Int. Cl.[5] .............................. G08B 23/00
[52] U.S. Cl. .............................. 340/968; 340/963; 364/434
[58] Field of Search ............... 340/968, 963, 967, 969; 244/181, 191, 182; 364/434; 73/178 T

[56] References Cited
U.S. PATENT DOCUMENTS

| | | | |
|---|---|---|---|
| 4,728,951 | 3/1988 | Johnson et al. | 340/968 |
| 4,855,738 | 8/1989 | Greene | 340/968 |
| 4,857,922 | 8/1989 | Miller et al. | 340/968 |

Primary Examiner—Jin F. Ng
Assistant Examiner—Brent A. Swarthout
Attorney, Agent, or Firm—Arnold L. Albin; Dale E. Jepsen

[57] ABSTRACT

A windshear warning system having an adjustable threshold to avoid triggering nuisance windshear alerts wherein the magnitude and duration of the shear are not sufficient to endanger an aircraft that is flying a landing approach at greater-than-normal approach speed. The present invention provides for variable detection times in either a variable threshold windshear detection or a fixed threshold detection system. A measurement of angle or attack is used to deduce the aircraft's approximate weight from which a normal landing approach speed may be calculated. The difference between the computed landing approach speed and the actual approach speed is used to calculate an add-on differential to the windshear system detection threshold. The add-on factor and a predetermined timing factor dependent on the power-to-weight ratio of the aircraft are combined to derive a new timing value for a variable threshold warning system which delays the windshear alert based on the magnitude of the windshear and the increase over the normal approach speed.

6 Claims, 8 Drawing Sheets

METHOD AND APPARATUS FOR ADJUSTING WINDSHEAR WARNING THRESHOLD

BACKGROUND OF THE INVENTION

1. Field of the Invention

The invention relates generally to aircraft alarm or indicating systems and more particularly to a system with a variable alarm threshold for detecting and providing a warning of impending dangerous windshear conditions.

Windshears may be defined as the rate of change of wind due to the rapid changes in wind velocity and direction that an aircraft experiences with changes in altitude, position, or time, the most dangerous condition occurring during take-off and landing approaches. Windshear may result in changes in the air speed of the aircraft and undesired vertical accelerations. A windshear warning system provides an alarm or other indication to alert the pilot that a dangerous level of windshear exists so that he can take timely corrective action.

2. Description of the Prior Art

U.S. Pat. No. 4,857,922 assigned to the assignee of the present invention, describes an apparatus responsive to both the magnitude of the windshear and the allowable time the windshear can be tolerated at a given magnitude. The sensed magnitude is used to compute the allowable time before providing a windshear alarm. For larger windshear rates, the allowable time is short; conversely, for small windshear rates which exceed a predetermined threshold level, a longer time period is computed before an alarm occurs. This approach minimizes or eliminates nuisance or false warnings of windshear to the flight crew where the aircraft possesses sufficient energy so that the windshear poses no serious threat to safety of flight.

Most current windshear detection systems rely on establishing a given threshold beyond which a measured windshear will result in a warning to the flight crew. These thresholds are, in general, somewhat independent of the actual energy level of the aircraft and therefore may result in an alert of a windshear condition, when, in fact, the aircraft has a surplus if kinetic energy and can easily cope with the measured level of windshear. Such an alert is generally referred to as a "nuisance" alert; that is, an alert which unnecessarily is indicated to the flight crew, since the aircraft has sufficient energy to deal with the windshear magnitude. When the flight crew has been alerted to expect either turbulence or windshear, as by the control tower or an onboard windshear detection system, it is relatively common for the crew to fly the aircraft at a speed greater than the normal landing approach speed. Hence, the ideal windshear detection system should account for any change in kinetic energy to adjust its detection thresholds.

U.S. Pat. No. 4,855,738 provides a system in which the windshear warning threshold is varied as a function of the excess of the approach air speed over the normal approach air speed for the aircraft. This patent suggests, for example, manual input by the pilot of the numerical value of the normal approach reference air speed. However, this is an undesirable feature, as the flight crew may forget to enter the data, thus precluding proper operation of the system, or the flight crew may enter the data incorrectly, thus negating the advantage of the scheme. It is also proposed to compute the normal approach reference air speed in a manner similar to that used for computing the approach air speed as set fourth in flight manuals. That method used parameters including the actual air speed of the aircraft, the acceleration normal to the flight path, flap position, and angle of attack. However, the normal acceleration and angle of attach sensors are affected by turbulence and are sensitive to speed variations. Consequently, fluctuations in computing the normal approach speed result in errors in the windshear warning threshold adjustment.

The present invention relies on a computation of normal approach speed based on the flap position and weight of the aircraft, the latter of which is not generally known save from direct pilot entry into the windshear detection system. The present invention overcomes the shortcomings of the prior art by using a measurement of angle of attack and deducing the aircraft's approximate weight and normal landing approach speed. The difference between the computed landing approach speed and the actual approach speed is used to calculate an "add-on" differential to the windshear system detection threshold. Further, the estimated weight parameter thus derived can be utilized by other aircraft systems, thus obviating the need for a pilot input in those systems.

SUMMARY OF THE INVENTION

The invention comprises a windshear warning system for aircraft including a threshold detector which responds when a windshear rate signal exceeds a predetermined threshold of detection. The threshold detector activates a first timer to provide a first timing signal that is proportional in magnitude to the duration of the windshear rate signal. The threshold detector further activates a second timer which generates a second timing signal computed in accordance with the maximum allowable duration that the aircraft may be sustained in safe flight at a given windshear rate. The first and second timing signals are algebraically summed, and when the first timing signal exceeds the second timing signal, a windshear warning alert is generated.

The second timer comprises an apparatus for computing a differential speed based on inputs of flap position, angle of attack, calibrated air speed, and normal acceleration. These parameters are used to compute an estimate of the weight of the aircraft from which a normal approach speed may be determined. The difference between the computed normal approach speed and the sensed calibrated air speed are used to generate a speed additive signal which is combined with a further timing signal variable in accordance with the value of the windshear rate signal and a predetermined value of an aircraft parameter representative of a power-to-weight ratio.

DESCRIPTION OF THE PREFERRED EMBODIMENT

Figure 1:
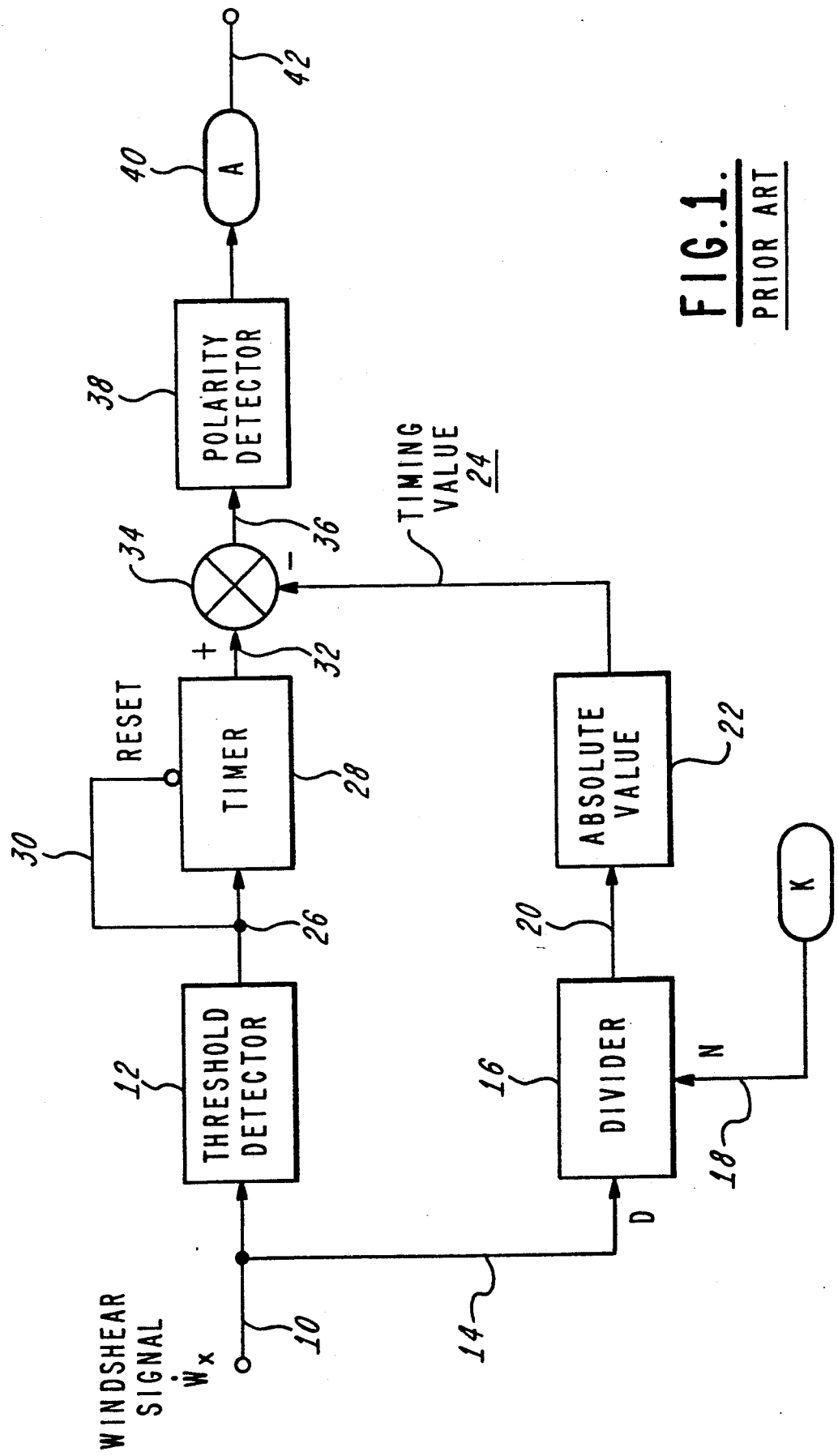
FIG. 1 is a block diagram of a windshear threshold detector of the prior art.

U.S. Pat. No. 4,857,922 is a windshear warning apparatus utilizing a variable detection threshold as described above, and is hereby incorporated by reference. FIG. 10 therein is reproduced herein as FIG. 1 with the exception of the reference numerals, which have been revised for convenience. As described in the '922 patent, a windshear signal $W_x$ applied to lead 10 activates threshold detector 12 when a given threshold, say 0.04 g, is exceeded. Detector 12 then activates timer 28, which provides a signal 32 proportional in magnitude to the elapsed time since detector 12 was triggered. The windshear signal $W_x$ is also applied to a divider 16 which receives a predetermined signal K on lead 18 which is representative of a power-to-weight ratio of the aircraft. The quotient thereof is applied on lead 20 to an absolute value taker 22 and the resultant timing value 24 applied in a subtractive sense to summing junction 34. The difference between the signal 32 from timer 28 and timing value 24 is applied to polarity detector 38. Polarity detector 38 operates in such a fashion as to provide a signal having a logical value of one on lead 42 whenever the signal at lead 36 is positive in sign; that is, whenever the actual elapsed time 32 exceeds the computed timing value 24, which is representative of the allowable time that the aircraft may be sustained in safe flight in the presence of a given magnitude windshear. For a null or negative signal at lead 36, the output of polarity detector 38 will be a logical zero.

The logical signal on lead 42 and terminal A reflects a windshear disturbance and may be used to activate a visible or audible alarm or to enable a windshear guidance system.

Figure 2:
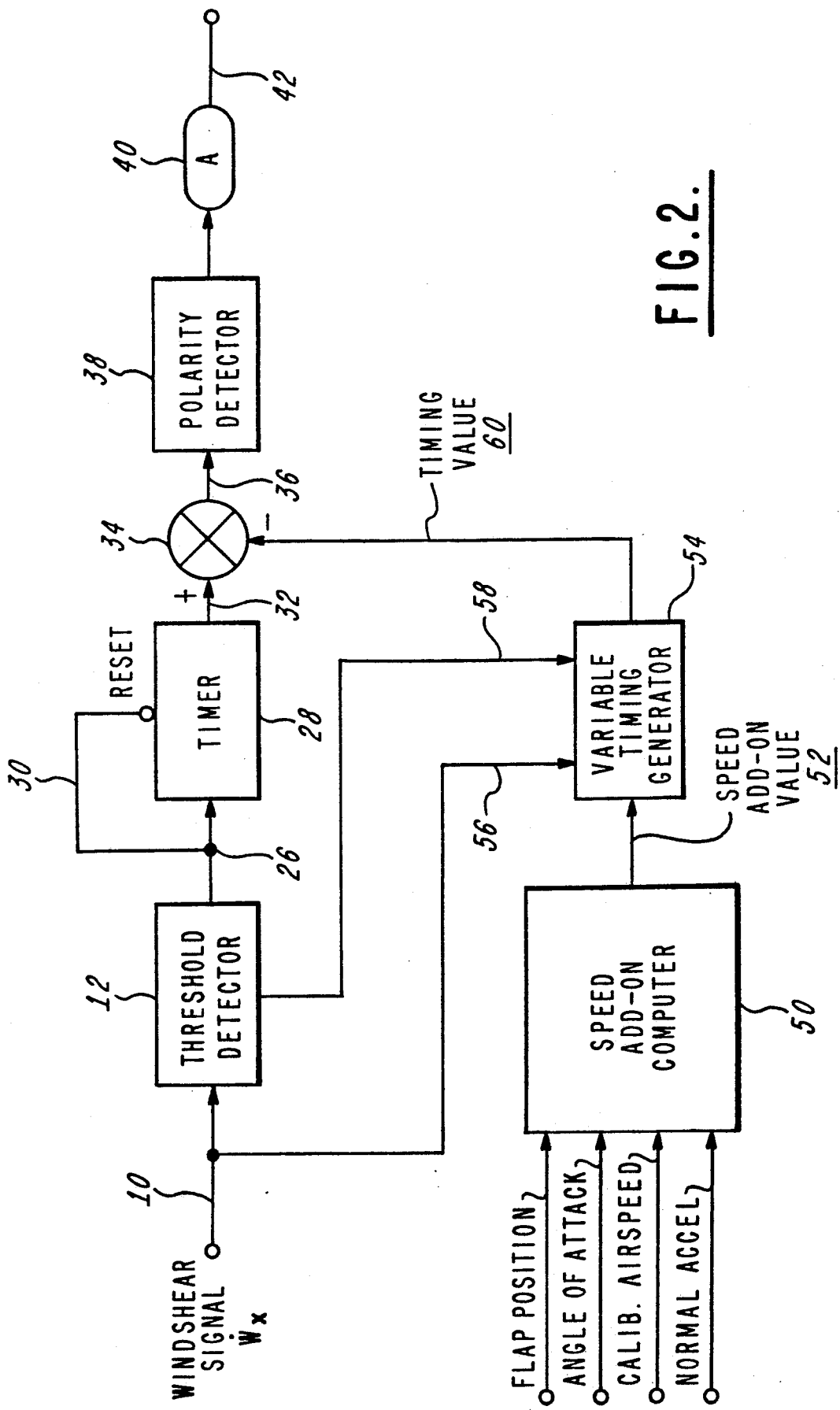
FIG. 2 is a functional block diagram of the invention as applied to the prior art of FIG. 1.

Referring to FIG. 2, there is shown a functional block diagram of the variable timing generator of the present invention. Speed add-on computer 50 and variable timing generator 54 replace divider 16 and absolute value taker 22 of the '922 patent. The speed add-on value 52 is deduced by computer 50 in a manner to be described. The speed add-on value is then applied to generator 54 to generate a new timing value 60 which is a function of the computed normal approach speed of the aircraft and the windshear magnitude signal $W_x$.

Figure 3:
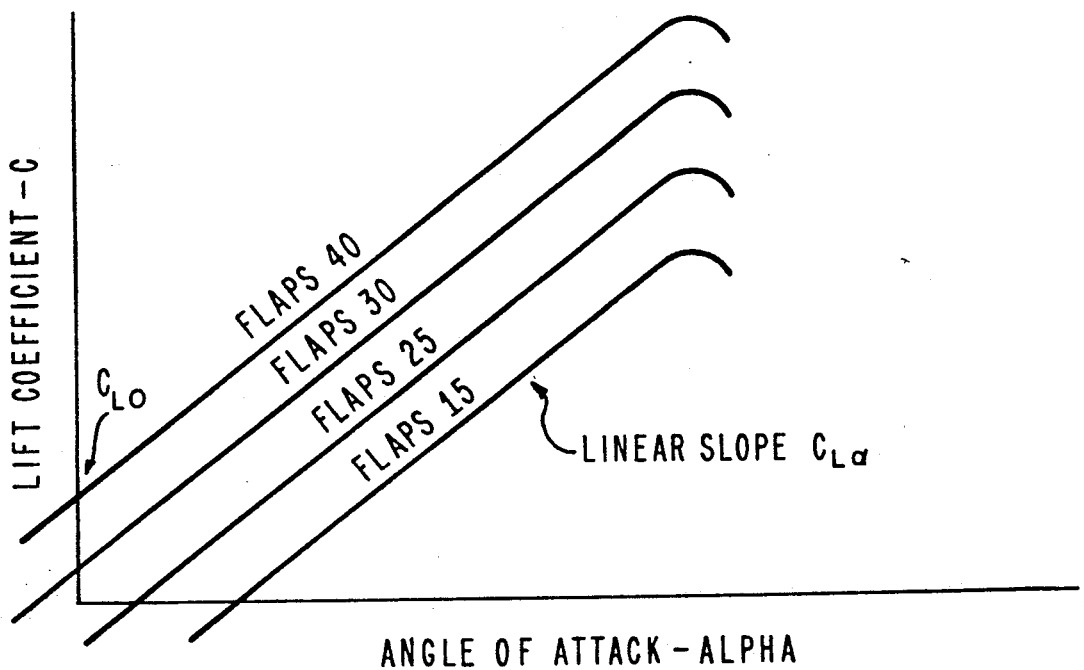
FIG. 3 is a graph of aircraft lift coefficient versus angle of attack with flap position as a parameter.

The present invention utilizes well-known aerodynamic relationships to compute an estimate of the actual aircraft weight and from this determines the normal landing approach speed, typically 1.3 times the stall speed, or 1.3 $V_s$. The input signals required for the calculations are:

$\alpha$ = aircraft angle of attack
n = aircraft normal acceleration
V = aircraft calibrated air speed
$\theta$ = aircraft flap position Referring now to FIG. 3, there is illustrated the typical relationship between the lift coefficient of the aircraft and angle of attack for various flap positions. Over the linear portion of the curve (i.e., for angles of attack less than stall) the relationship may be expressed by the well-known equation:

$$C_l = C_{LO} + C_{L\alpha}\alpha \qquad (1)$$

where CL is the aircraft's lift coefficient and is dimensionless; $C_{LO}$ is the lift coefficient for zero angle of attack, also dimensionless; $C_{L\alpha}$ is the slope of the lift coefficient curve in 1/deg.; and $\alpha$ is the aircraft's angle of attack in degrees. From Equation (1), for a given flap setting and angle of attack, the lift coefficient may readily be computed.

The lift coefficient is related to the weight of the aircraft by the well-known relationship:

$$C_L = nW/qS \qquad (2)$$

where $C_L$ is the lift coefficient, n is the normal acceleration of the aircraft in gravitational units, W is the weight of the aircraft in pounds, q is the dynamic pressure in pounds per sq. ft., and S is the wing area of the aircraft in sq. ft.

Solving Equation (2) for the aircraft's weight yields:

$$W = qSC_L/n \qquad (3)$$

The dynamic pressure q may be computed by the equation:

$$q = V^2/295 \qquad (4)$$

where V is the aircraft's calibrated airspeed in knots. Substituting Equation (4) into Equation (3), where a constant U is assigned a value equal to S/295 yields:

$$W = UC_L V^2/n \qquad (5)$$

Since $C_L$ is known from Equation (1) and V and n are measured quantities, the estimated weight of the aircraft may be determined directly from Equation (5). By relating the weight of the aircraft to the aircraft's stall speed for various flap settings, a normal approach speed may be calculated as follows.

Figure 4:
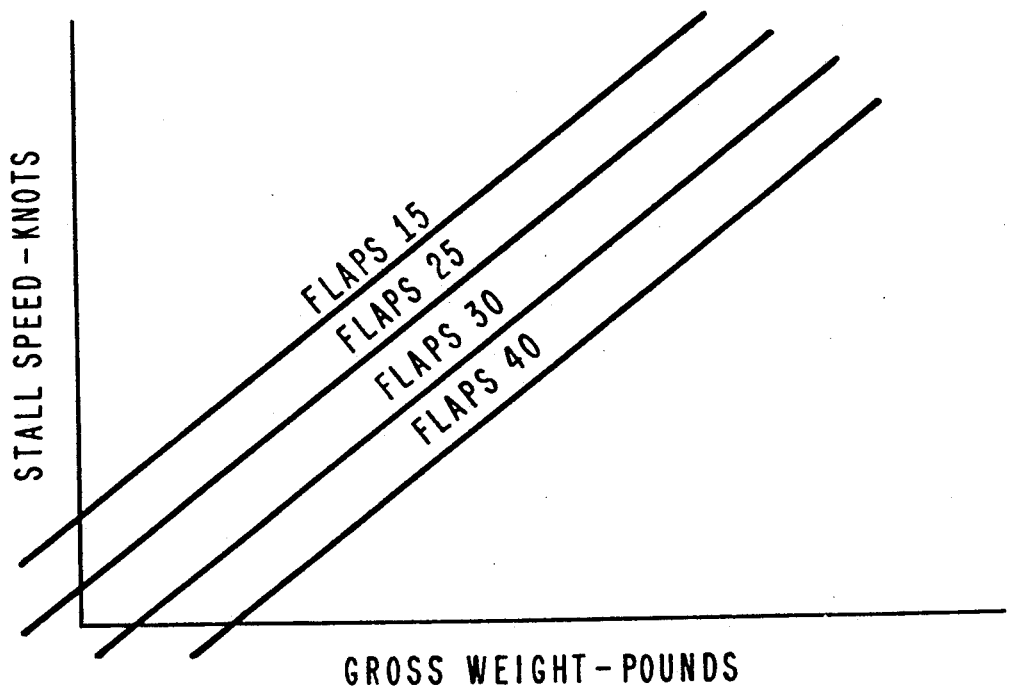
FIG. 4 is a graph of stall speed versus gross weight of the aircraft with flap position as a parameter.

A typical relationship between the aircraft's stall speed and its weight for various flap settings is shown in FIG. 4. These data may be curved-fit in methods well-known to those skilled in the art to yield an equation for each flap position that may be solved for the stall speed when the weight is known. Once the stall speed has been determined, the normal approach speed may be readily calculated. The normal approach speed is typically the stall speed of the aircraft times 1.3; that is:

$$V_{normal} = 1.3\ V_s \qquad (6)$$

With the calculated value of normal approach speed, a comparison can be made with the calibrated airspeed as follows:

$$V_{add\text{-}on} = V_{calib} - V_{normal} \qquad (7)$$

where $V_{add\text{-}on}$ is the speed increase over the normal approach speed in knots. The "add-on speed" may now be used to modify the detection thresholds of a windshear detection system a will be described.

Figure 5:
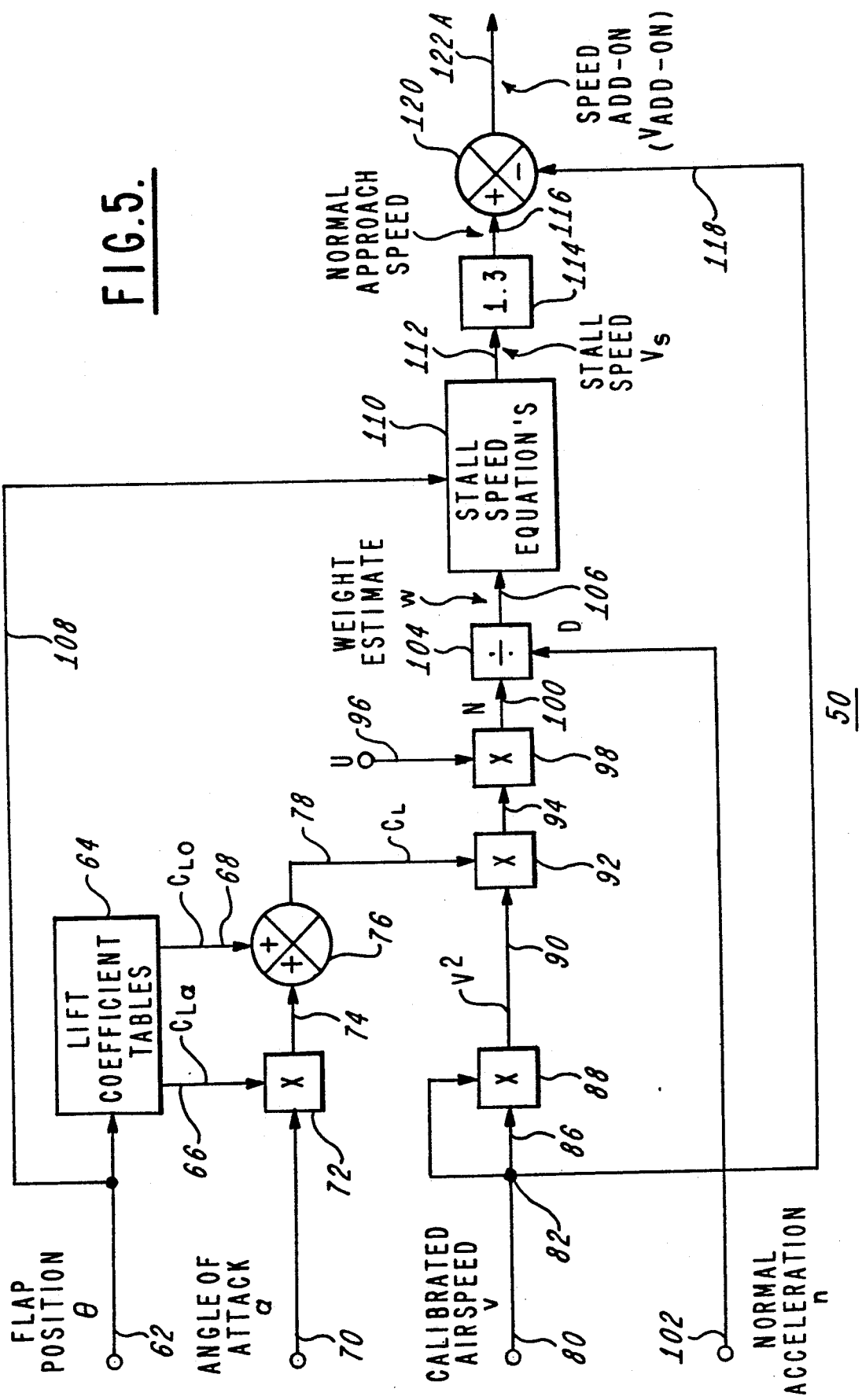
FIG. 5 is a functional block diagram of the speed add-on computer.

Referring now to FIG. 5, there is shown a functional block diagram of an apparatus for calculating a differential speed factor, herein referred to as the speed add-on. The present invention may be implemented by using conventional analog circuitry and computational techniques or by using conventional wholly digital techniques or by using conventional hybrid digital/analog techniques. To simplify the understanding of the invention, it will be explained by using a generally analog format as shown in FIG. 5, it being understood that the same analog format may also represent, in block diagram form, the program of a programmable digital computer wherein the various analog inputs are converted to digital signals for digital processing and the various digital outputs are converted to analog signals for driving the windshear alarm indicators.

A signal 62 corresponding to the angular position of the flap is applied to function block 64, wherein are stored the lift coefficient tables corresponding to the curves of FIG. 3. The data may be stored in a conventional manner, such as in the form of resistive networks and operational amplifiers for an analog embodiment or in a programmable memory in a digital embodiment.

The values of the slope of the lift coefficient curve and the lift coefficient for zero angle of attack appear on leads 66 and 68, respectively. A signal representative of angle of attack is applied on lead 70 to multiplier 72 to provide the product $\alpha C_{L\alpha}$ and outputted on lead 74. Lead 74 applies the product signal thereon to summing junction 76 where it is algebraically combined with the signal $C_{LO}$ on lead 68. The resultant term is the aircraft's lift coefficient $C_L$ which appears on lead 78 and is applied to a multiplier 92.

A signal representative of calibrated air speed V is applied on lead 80 to node 82 where it is distributed via leads 84 and 86 to the inputs of a multiplier 88 to provide a product signal $V^2$ on lead 90. The signal on lead 90 is applied to multiplier 92 to provide a product with the $C_L$ term on lead 78. The product thereof, $C_L V^2$, appears on lead 94 and is applied to a further multiplier 98. The constant U which has heretofore been defined is applied on lead 96 to a second input of multiplier 98 to provide the product $UC_L V^2$, which is applied on lead 100 to a divider 104 as the numerator. A signal n representative of normal acceleration of the aircraft is applied on lead 102 as the divisor of divider 104. The quotient of the signals applied to leads 100 and 102 appears at the output 106 and corresponds to the weight estimate W heretofore described. Functional block 110 has stored therein the stall speed tables as shown in FIG. 4. The stall speed data may be stored in a manner as described with respect to the lift coefficient tables 64. The flap position signal 62 on lead 108 and the weight estimate W o lead 106 are applied to function block 110 to generate a signal $V_S$ representative of stall speed at the given gross weight and flap position, which signal appears on lead 112. The value of the stall speed signal is multiplied in block 114 by a gain factor of 1.3 to provide a computed value of normal approach speed on lead 116. The normal approach speed signal is applied to a summing junction 120. The calibrated air speed signal V at node 82 is coupled on lead 118 and algebraically combined with the normal approach speed signal in a subtractive sense at summing junction 120. The resultant signal appears at the output of summing junction 120 on lead 122A as the speed add-on differential speed signal.

In operation, the speed differential term may be used to vary the timing curves explained in the '922 patent. FIG. 11 therein shows an example where the timing curve is based on the relationship:

$$t = 0.237/|W_x| \quad (8)$$

where $W_x$ is the measured value of the windshear in gravitational units, and the vertical lines in the equation indicate that the absolute value is to be used. Thus, the allowable time during which the aircraft may sustain safe flight in a windshear is an inverse function of the magnitude of the wind rate, and the annunciation of a windshear condition is dependent on both the magnitude and duration of the wind rate. The invention of FIG. 5 may be used to vary the timing curves in a manner shown in FIG. 6.

From Equation (7), the speed add-on term $V_{add-on}$ is measured in knots. This may be converted to g-sec by multiplying by 0.0525, thereby by making the dimensions identical with those of the numerator in Equation (8). This term may then be added to Equation (8) as follows:

$$t = (0.237 + 0.0525 \, V_{add-on})/|W_x| \quad (9)$$

Figure 6:
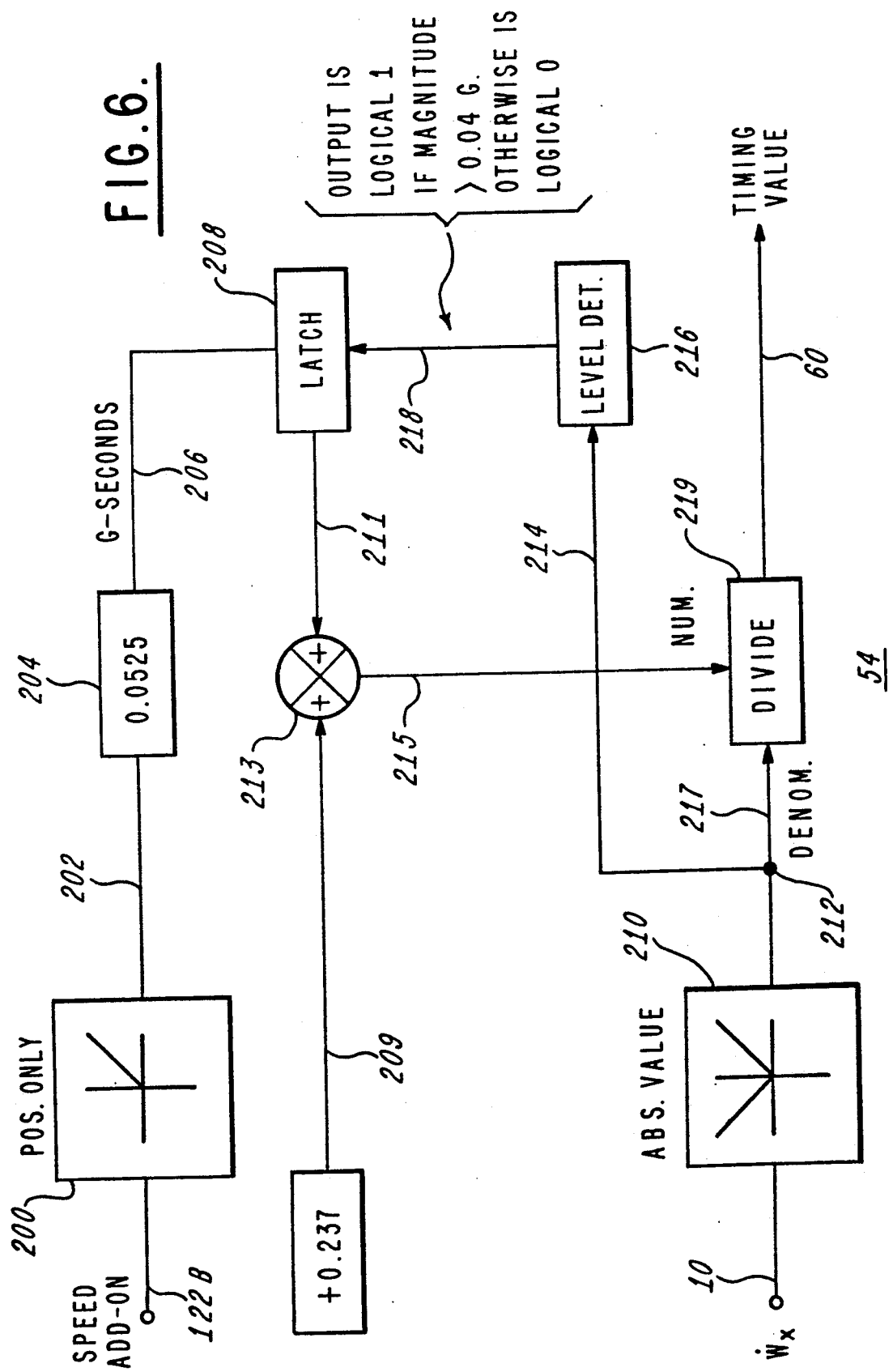
FIG. 6 is a functional block diagram of the variable timing generator utilizing the speed add-on modifier.

The implementation of the above equation for a windshear system using a trip level which is variable both in accordance with the magnitude and duration of the windshear and the normal approach speed is shown in FIG. 6.

Referring now to FIG. 6, a speed add-on signal, deduced as described above, is applied on lead 122B to function block 200, which assures that the value of $V_{add-on}$ must be positive; this assures that no compensation is made for values less than zero. Thus, when the aircraft is being flown at the normal approach speed, the value of $V_{add-on}$ is zero, and the system performs as it would without the incorporation of the present invention. Since the output of function block 200 on lead 202 is measured in knots, function block 204 applies a gain factor of 0.0525 to convert the speed add-on value to units of g-sec. This value appears on lead 206 and is applied to a latch 208. The value of the add-on factor must be latched whenever the timer is started. Otherwise, with a decrease in the speed of the aircraft due to windshear, the computed value of the add-on differential factor would also decrease, thus negating the usefulness of the invention.

The output of latch 208 is applied on lead 211 to a summing junction 213 where it is algebraically combined in additive fashion with a constant signal having a value of 0.237 g-sec. on lead 209. The factor 0.237 is identical with the corresponding factor in Equation (8) derived from the '922 patent. The summed output from junction 213 appears on lead 215 and is applied as the numerator to a divider 219.

The windshear rate signal $W_x$ on lead 10 is coupled to absolute value taker 210 to provide a positive value for both negative and positive windshear rates, again in accordance with Equation (8). The absolute value signal appearing at node 212 is coupled as the denominator on lead 217 to divider 219 and on lead 214 to level detector 216. Divider 219 thus provides an output on lead 60 in accordance with Equation (9), which represents the new timing value to be applied to the windshear warning system.

In operation, whenever the air speed exceeds the normal approach speed, a speed add-on differential $V_{add-on}$ is generated, appropriately processed by function blocks 200 and 204, and latched at latch 208. At the same time, this value is summed with the predetermined value on lead 209. Level detector 216 receives the absolute value of the windshear signal $W_X$ and provides a logical one output on lead 218 to latch 208 if the magnitude exceeds a predetermined positive level of the order of 0.04 g. Otherwise, the output of level detector 216 is a logical zero. When level detector 216 activates latch 208, summing junction 213 delivers its output to divider 219, where it is combined with the windshear signal on lead 217 to generate the desired timing value 60. If the magnitude of the windshear signal at level detector 216 is less than 0.04 g, the output is a logical zero, and the variable timing circuit operates as described with respect to U.S. Pat. No. '922.

Figure 7:
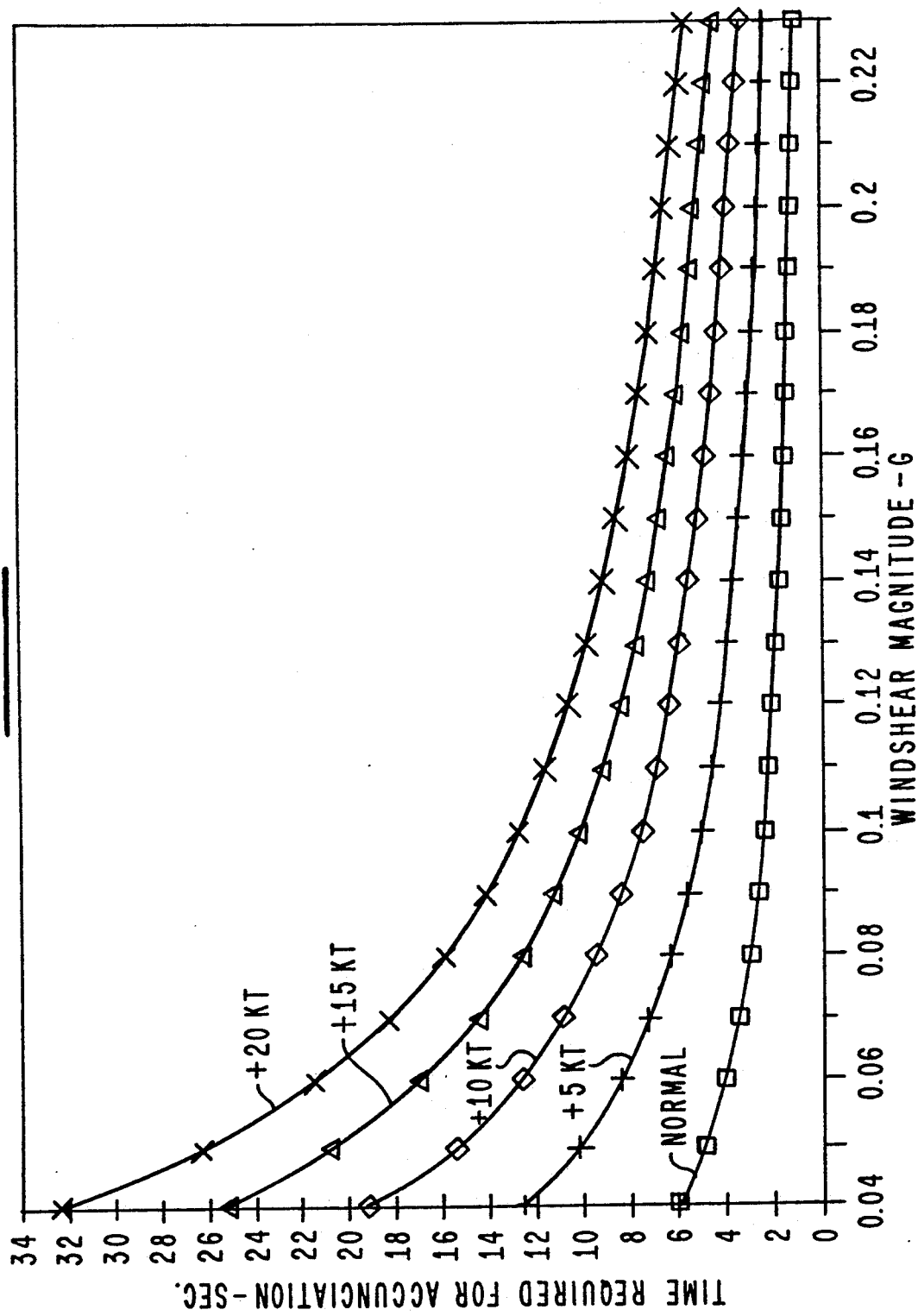
FIG. 7 is a graph showing the increase in time before a given level of windshear magnitude will exceed a predetermined threshold using a variable trip level.

The effect of the circuit of FIG. 6 and the Equation (9) on the timing curve is shown for various add-on speed differentials in FIG. 7. For example, a windshear magnitude of 0.1 g at normal approach speed allows approximately 3 seconds before a warning is generated. With a nominal 10 knot increase over the normal approach speed, as is commonly used by the flight crew, the invention provides as much as 8 seconds until warning, which is a substantial improvement over the prior art.

Figure 8:
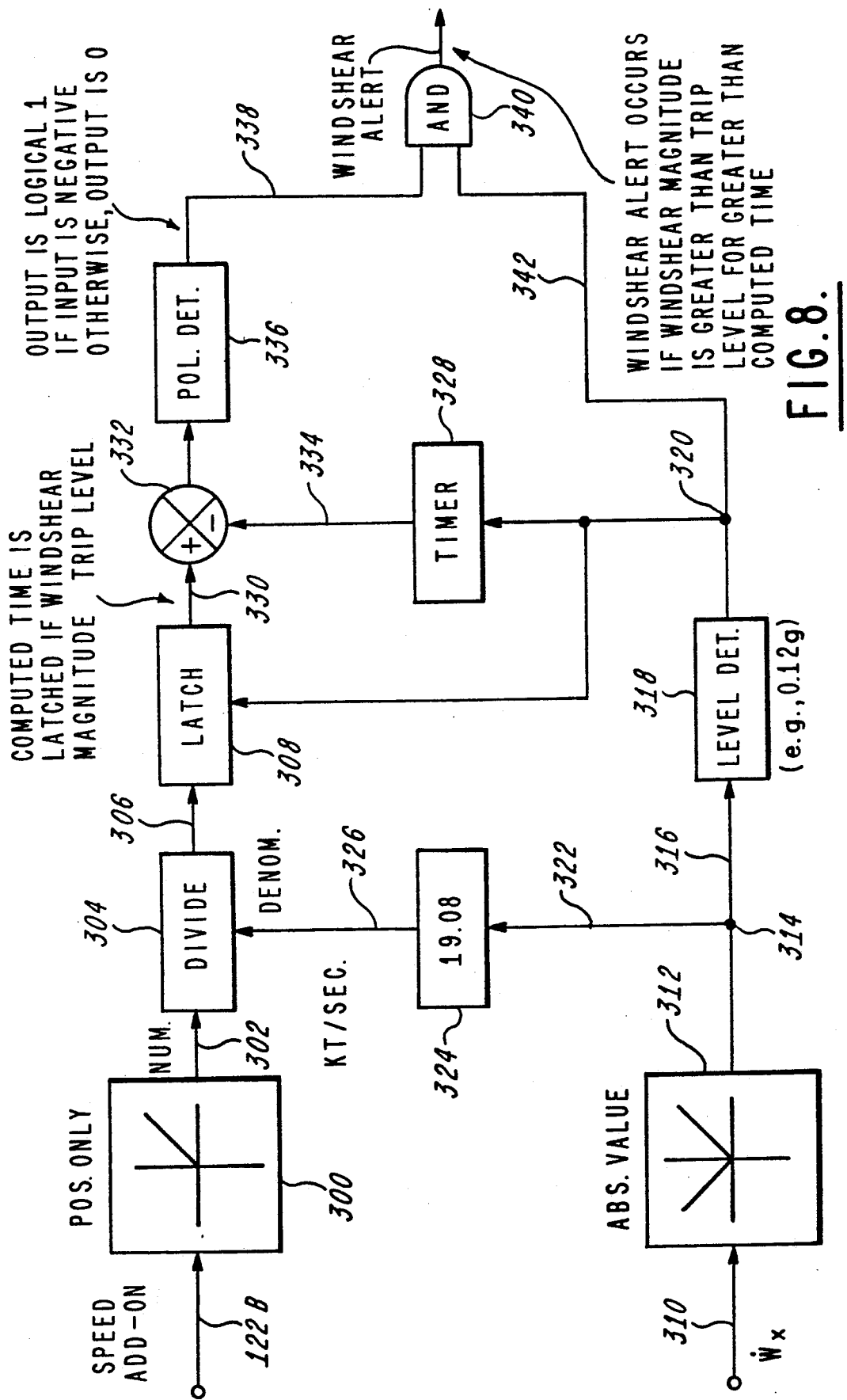
FIG. 8 is a functional block diagram showing the utilization of the speed add-on computer with a windshear detection system employing a fixed threshold.
Figure 9:
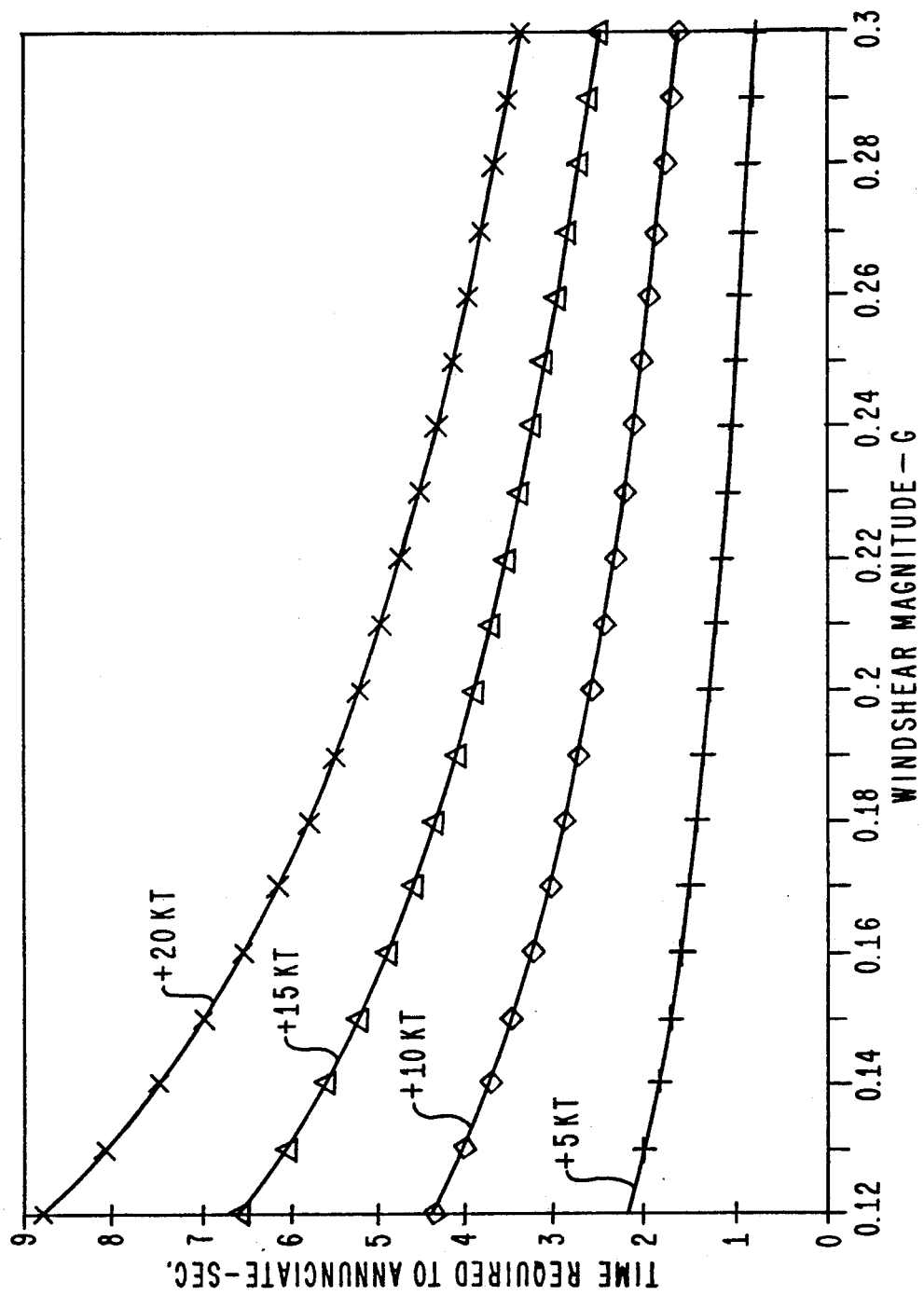
FIG. 9 is a graph of the increase in allowable warning time as a function of windshear magnitude and normal approach speed for a fixed detection threshold.

For other windshear detections that utilize a fixed threshold, for example, 1.12 g, the add-on speed differential may be incorporated as shown in FIG. 8. A speed add-on differential, computed as described previously, is applied on lead 122B to a function block 300, which provides an output only when the speed add-on has a positive value. The output is applied on lead 302 to divider 304. A windshear $W_X$ on lead 310 is applied to function block 312, which provides an absolute value of the windshear to node 314. The signal at node 314 is applied on lead 316 to level detector 318 which outputs a signal to node 320 when a predetermined windshear level is exceeded, say 0.12 g. The windshear signal at node 314 is also coupled via lead 322 to gain block 324 which converts the windshear rate signal in gravitational units to units of kt/sec. The converted signal output of block 324 is applied on lead 326 as the denominator to divider 304. The output of divider 304 on lead 306 is the timed duration in seconds in which the additional energy provided by the speed add-on differential will be dissipated at the given windshear magnitude. Consider, for example, a shear magnitude of 0.15 g, the equivalent of 2.86 kt/sec. If the speed of the aircraft is 15 kt above the normal approach speed (that is, the add-on differential is 15 kt), then the speed of the aircraft will decrease to the normal approach speed in 15/2.86=5.25 seconds. For a value of shear of, say, 0.2 g (3.81 kt/sec.), the time for the speed to decrease to the normal approach speed is 3.9 sec. These values are shown typically in FIG. 9.

When the windshear signal 316 triggers level detector 318, the output signal at node 320 also triggers timer 328 and latch 308. Thus, the timing signal stored in latch 308, when triggered by level detector 318, is latched and provided on lead 330 in an algebraic additive sense to summing junction 332. Timer 328 is initiated and provides a timing signal on lead 334 which is representative of the elapsed time since the windshear rate exceeded the threshold level and is applied in a subtractive sense to summing junction 332. The algebraic summation of the signals applied to summing junction 332 is provided to polarity detector 336 which generates a logical one output when the applied signal is negative; that is, when the elapsed time generated by timer 328 exceeds the time stored in latch 308 corresponding to the available energies afforded by the speed add-on differential signal. If the speed add-on timing signal exceeds the elapsed time generated by timer 328, the output of summing junction 332 will be positive and polarity detector 336 will output a zero logic signal. The output of polarity detector 336 is applied on lead 338 to one input of logical AND gate 340. The output of level detector 318 and node 320 is applied on lead 342 to a second input of logical AND gate 340. Thus, when a windshear occur that is greater than the fixed trip level of level detector 318, timer 328 determines whether an annunciation should be made to the flight crew. A windshear alert occurs if the windshear magnitude is greater than the trip level for a time period greater than the time computed by the speed add-on circuit. The timer would be started at the trip level crossing and would not allow initiation unless the windshear had exceeded the threshold for a time period equal to $$t = V_{add-on}/|W_x| \qquad (10)$$

seconds. Note that the apparatus automatically compensates for the case where the aircraft is being flown at the normal approach speed, and the system will perform as though the present invention were not incorporated.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. In a windshear warning system for aircraft of the type including threshold detector means responsive to the magnitude of a windshear signal exceeding a predetermined threshold of detection, first timer means activated by said threshold detector means for providing a first timing signal proportional in magnitude to the duration of the windshear rate signal after said detector means is activated, second timer means activated by said threshold detector means for generating a second timing signal representative of a maximum allowable duration that the aircraft may be sustained in safe flight at a given windshear rate, and means for algebraically summing said first and second timing signals and for generating a windshear warning signal when said first timing signal exceeds said second timing signal, wherein said second timer means further comprises:

differential speed computation means responsive to a source of signals representative of flap position, angle of attack, calibrated air speed, and normal acceleration, for generating a signal corresponding to weight of the aircraft means responsive to said weight signal and said flap position signal for deriving a stall speed signal representative thereof, means for applying a predetermined multiplier to said stall speed signal for deriving a normal approach speed signal proportional to the product thereof, means for applying said signal representative of calibrated airspeed to said normal approach signal to derive a speed additive signal representative of the difference between said normal approach speed signal and said calibrated air speed signal, means for providing a signal corresponding to a predetermined power/weight ratio of the aircraft, and means for combining said speed additive signal, said power/weight signal, and said windshear rate signal to derive said second timing signal, and means for algebraically summing said first and second timing signals and generating a windshear warning signal when said first timing signal exceeds said second timing signal in a positive sense without manual intervention by the pilot.

2. Windshear warning system for aircraft of the type including threshold detector means responsive to a windshear signal exceeding a predetermined threshold of detection and means for providing an absolute value of said windshear signal, differential speed computation means responsive to a source of signals representative of flap position, angle of attack, calibrated air speed, and normal acceleration, for generating a signal corresponding to a weight of the aircraft means responsive to said weight signal and said flap position signal for deriving a stall speed signal representative thereof, means for applying a predetermined multiplier to said stall speed signal for deriving a normal approach speed signal, means for providing a speed additive signal representative of the algebraic difference between a normal approach speed and a measured calibrated air speed, means responsive to said speed additive signal for providing an output thereof only when said algebraic difference has a positive value, divider means responsive to the ratio of a function of said absolute value windshear signal to the positive value of said speed additive signal for providing a signal corresponding to a quotient thereof, latch means responsive to said threshold detector means for providing a constant value of said quotient signal when said threshold detector means is activated by a windshear signal exceeding said predetermined threshold of detection, timer means for providing a signal corresponding to an elapsed time interval after said predetermined threshold of detection is exceeded, summing means for providing an algebraic difference of said constant value signal and said signal produced by said timer means, polarity detector means responsive to said summing means for providing an output indicative of the algebraic sense thereof, and logic gate means responsive to said threshold detector means and said polarity detector means for providing a warning signal when said windshear signal exceeds said predetermined threshold for a time duration which is a function of said speed additive signal and indicative that the landing approach speed of the aircraft is insufficient to sustain safe flight in the presence of the windshear.

3. A method for providing a warning signal for an aircraft encountering a windshear, including the steps of:

providing a detector having an output responsive to a windshear signal exceeding a predetermined threshold of detection, providing a first timer to generate a first timing signal when activated by said detector, wherein said first timing signal is activated by the windshear signal exceeding a threshold of detection, providing signal representative of flap position, angle of attack, calibrated air speed, and normal acceleration for generating a signal corresponding to the weight of the aircraft, deriving a stall speed signal from said weight signal and said flap position signal, applying a predetermined multiplier to said stall speed signal to derive a normal approach speed signal proportional to the product thereof, applying said signal representative of calibrated air speed to said normal approach speed signal to derive a speed additive signal representative of the difference between said normal approach speed signal and said calibrated air speed signal, providing a signal corresponding to a predetermined power/weight ratio of the aircraft, providing a second timer activated by said detector and responsive to said windshear signal, said power/weight signal and said speed additive signal for generating a second timing signal without manual pilot intervention, corresponding to a maximum allowable duration that the aircraft may be sustained in safe flight at a given windshear magnitude, and algebraically summing said first and second timing signals and generating a windshear warning signal when said first timing signal exceeds said second timing signal in a positive sense.

4. In a windshear system for aircraft of the type including threshold detector means responsive to the magnitude of a windshear signal exceeding a predetermined threshold of detection, first timer means activated by said threshold detector means for providing a first timing signal proportional in magnitude to the duration of the windshear rate signal after said detector means is activated, second timer means activated by said threshold detector means for generating a second timing signal representative of a maximum allowable duration that the aircraft may be sustained in safe flight at a given windshear rate, and means for algebraically summing said first and second timing signals and for generating a windshear warning signal when said first timing signal exceeds said second timing signal, wherein said second timer means further comprises a. differential speed computation means responsive to a source of signals representative of flap position, angle of attack, calibrated air speed, and normal acceleration, for generating a signal corresponding to weight of the aircraft, b. means responsive to said weight signal and said flap position signal for deriving a stall speed signal representative thereof, c. means for applying a predetermined multiplier to said stall speed signal for deriving a normal approach speed signal proportional to the product thereof, d. means for applying said signal representative of calibrated airspeed to said normal approach signal to derive a speed additive signal representative of the difference between said normal approach speed signal and said calibrated air speed signal, e. means for providing a signal corresponding to a predetermined power/weight ratio of the aircraft, f. means for combining said speed additive signal, said power/weight ratio signal, and said windshear rate signal to derive said second timing signal, and g. means for algebraically summing said first and second timing signals and generating a windshear warning signal when said first timing signal exceeds said second timing signal in a positive sense without manual intervention by the pilot, wherein said differential speed computation means further comprises:

h. means responsive to a give angular flap position for providing corresponding values to lift coefficient of the aircraft as a function of angle of attack, i. means responsive to a given angle of attack of the aircraft and said values of lift coefficient to provide a predetermined value of lift coefficient of the aircraft at said given angle of attack, j. means for providing a signal which is a product of the value of calibrated air speed, said predetermined value of lift coefficient, and the wing area of the aircraft, k. means responsive to the ratio of said product signal and a value of normal acceleration of the aircraft for providing a quotient thereof representative of the weight of the aircraft, l. means responsive to a given angular flap position for providing corresponding values of stall speed of the aircraft as a function of weight of the aircraft, m. means responsive to the angular flap position of the aircraft, said means for providing values of stall speed, and said quotient representative of weight of the aircraft for providing a value of stall speed corresponding thereto, n. means for providing a predetermined gain factor to said value of stall speed to provide a signal representative of a value of normal approach speed, and o. summing means for providing an algebraic difference of said signal representative of normal approach speed and said value of calibrated air speed, said difference comprising said speed additive signal.

5. Windshear warning system for aircraft as set forth in claim 4, wherein said differential speed computation means is further comprised of the relationship:

$$W = UC_L V^2/n$$

where
 W = weight of the aircraft in pounds
 $C_L$ = lift coefficient of the aircraft at a given flap position, where $C_L$ is a predetermined function of the angle of attack of the aircraft
 V = calibrated air speed in knots
 n = normal acceleration in gravitational units
 U = a parameter proportional to the ratio of wing area in sq. ft. and a predetermined constant proportional to dynamic pressure.

6. Windshear warning system for aircraft as set forth in claim 5, wherein said second timer means comprises:
 means responsive to the magnitude of said windshear signal for providing an absolute value thereof,
 means responsive to said speed additive signal for providing an output thereof only when said algebraic difference has a positive value,
 gain means for applying a predetermined gain factor to said speed additive signal,
 latch means responsive to said threshold detector means for providing a latched speed additive signal, said latch signal comprising a constant signal corresponding to said speed additive signal when said threshold detector means is activated by a windshear signal exceeding said predetermined threshold of detection, and for providing a null signal when said threshold detector means is not activated,
 means for providing said signal corresponding to a predetermined power/weight ratio,
 means for algebraically summing said latched speed additive signal and said signal corresponding to a predetermined power/weight ratio, and
 divider means responsive to the ratio of said absolute value of said windshear signal to said summed speed additive and power/weight ratio signals for providing a timing value signal.

* * * * *